G. WENZELMANN & W. H. HARRISON.
ANIMAL OILING DEVICE.
APPLICATION FILED AUG. 24, 1914.
1,235,265.
Patented July 31, 1917.
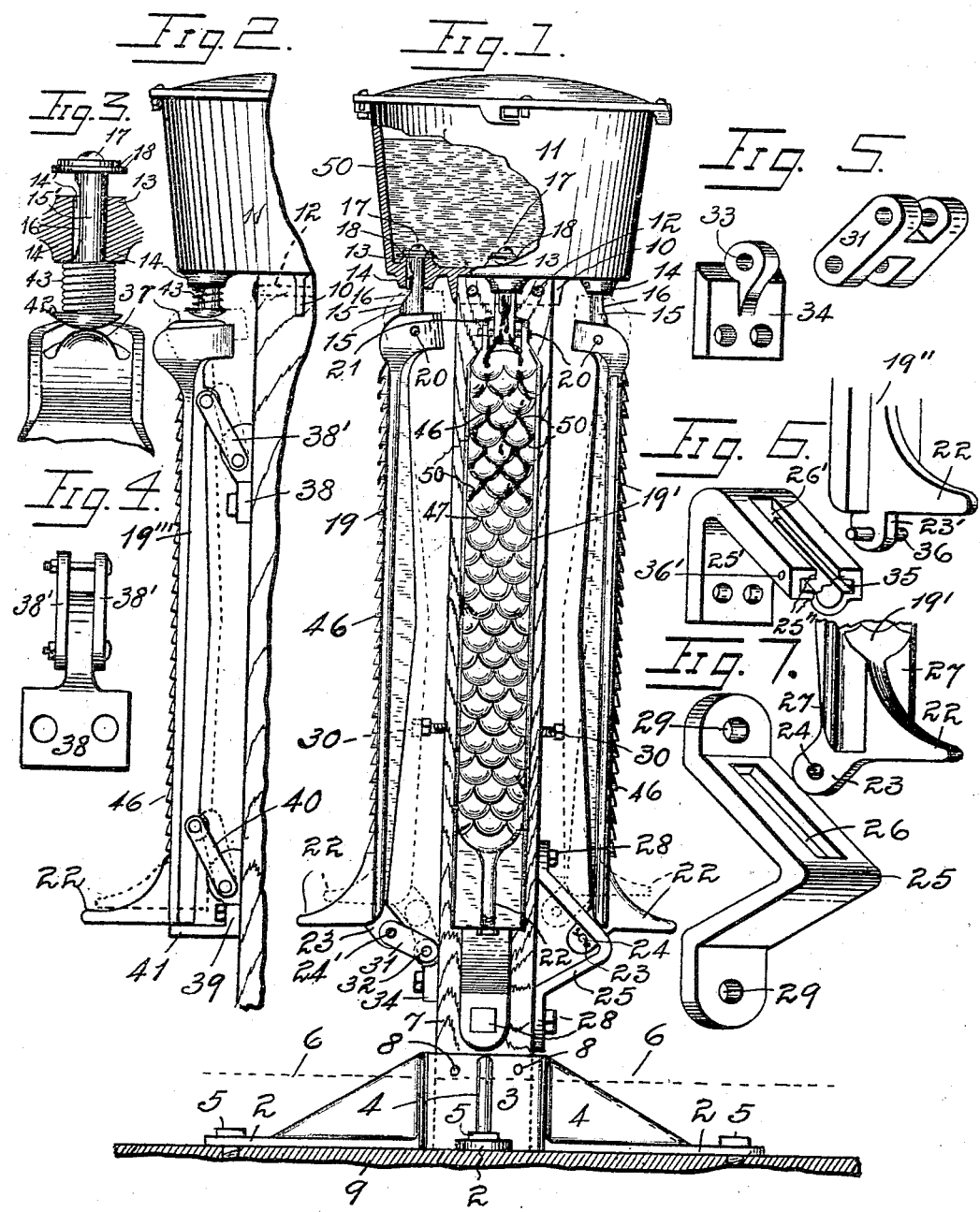

UNITED STATES PATENT OFFICE.

GUSTAVE WENZELMANN AND WILLIAM H. HARRISON, OF GALESBURG, ILLINOIS; SAID HARRISON ASSIGNOR TO SAID WENZELMANN.

ANIMAL-OILING DEVICE.

1,235,265.       Specification of Letters Patent.     Patented July 31, 1917.

Application filed August 24, 1914. Serial No. 858,235.

*To all whom it may concern:*

Be it known that we, GUSTAVE WENZELMANN and WILLIAM H. HARRISON, both citizens of the United States, and both residents of Galesburg, in the county of Knox and State of Illinois, have jointly invented a new and useful Animal-Oiling Device, of which the following is a specification.

Our invention relates to means attached to a centrally arranged supporting post and adapted to automatically apply vermin-destroying oil or the like to a hog or other animal as he rubs thereagainst in an attempt to allay the irritation caused by lice and other vermin.

The advantages gained or accruing from the employment of devices of this character are many, notable among which are that the animals will, without attention on the part of the husbandman other than to keep the oil-tanks supplied with the liquid, rid themselves from vermin, for they quickly learn that relief may be had by rubbing against the device and will seek it whenever irritation occurs; that the laborious operation of "dipping" the animals is avoided and that the owner is saved a large expense which is incurred because of the oil dripping off the animal and because of it being applied in vastly greater quantities than is necessary, whenever spraying, sprinkling or dipping is resorted to; and that the animals thrive much better when they can themselves have access to the oil at any and all times when irritation occurs, than when periodically administered in either of the manual methods mentioned, for during the periods between the manual treatments the vermin will gather (from their hiding places) and greatly annoy the animals. Hogs especially are subject to the attacks of lice and other vermin, and when they are not treated therefor they become thin and weak and are in no condition to resist the ravages of any of the diseases and ailments to which they are notably susceptible.

Observation has shown that in attempting to relieve himself by rubbing against an object a hog "weaves" or rubs against it in a circular motion—partly forward and back, partly from side to side, and partly upward and downward. The primary object of this invention is to provide a device the oil-discharging valves of which will be operated by an animal performing any of these movements.

A further object is to provide a device which is easily operated by weak hogs or even by small pigs.

It is an object to provide novel means for securing the oil-tank to the post.

It is a still further object to provide a novel rubbing-plate face, whereby the oil will adhere to the peculiarly constructed and arranged portions thereof and from which it will come in contact with, at the slightest touch of, the hog.

It is a special object to provide novel means associated with the rubbing-plates whereby they move in a novel manner and have a new mode of operation.

That the mechanism comprising the device be simple, economic of construction, strong, durable, and not liable to become disordered or inoperative by reason either of the rough usage to which it is subjected, or by exposure to the elements, is a requisite, and to provide such means for carrying out the foregoing recited objects constitutes another object of the invention.

Minor objects will be in part obvious and in part specifically pointed out.

Concisely stated, the general object of the invention is to improve the construction and increase the utility, efficiency, and ease of operation of devices of this nature.

Mechanism embodying preferred constructive forms of, and illustrating the principles, mutual relationship, and combinations of the parts of our improvements is illustrated in the acompanying drawings, in which:

Figure 1 is an elevation, partly broken away, showing at opposite sides like rubbing-plates but illustrating different means for giving them the same upwardly and inwardly inclined movement whereby to actuate the oil-supplying valves;

Fig. 2, a somewhat different form of rubbing-plate, rubbing-plate-actuating means, and valve;

Fig. 3, a detail of elements shown in Fig. 2;

Fig. 4, a detail of the upper bracket shown in Fig. 2;

Fig. 5, perspective details of the link shown in Fig. 1.

Fig. 6, modified perspective details of the elements shown in Fig. 7; and

Fig. 7, perspective details—one of them fragmental—of the triangular runway or bracket shown in Fig. 1.

Coming now to a detailed description of the drawings and referring to each element (and part thereof where necessary) by a distinguishing character, 2 designates a base having a centrally arranged socket 3 and radially extending arms 4. 5, 5 are screws by which it may be secured to the floor of a hog-house. 6 designates the top line of a cement foundation in which the base may be embedded, if preferred, to give the supporting post 7 great rigidity. 8, 8 are pins by which the post is secured in the socket 3.

Seated in a groove in the top of the post 7 is a fin 10 which projects from the bottom of an oil-tank 11. 12, 12 designate pins inserted through registering holes in said fin and post. The tank-bottom is provided with a plurality of upstanding bosses 13 the tops of which afford valve-seats, and with downwardly extending bosses 14, and each pair of these bosses is provided with a continuous aperture for the reception of valve-stems 15 reciprocable therein. The ends of each valve-stem are cylindrical and the median portion of the side of each is cut away to provide an oil-retainer 16, as shown best in Fig. 3. 17 designates a cap-screw by means of which a valve-closure 18 is secured to the top of each valve-stem, and these closures are adapted to rest on the valve-seats above described. 19, 19' designate rubbing plates, the inturned upper end of each of which is pivoted by a pin 20 to a valve-stem 15. Said upper end is fashioned to provide an oil-holder 21, shown best at the central plate in Fig. 1. The lower end of each plate is provided on its outer face with a projection 22 and on its inner face with an arm 23 having a transverse opening for the reception of a pin 24. 25, 25 designate brackets the upper arm of each of which is slotted at 26 for the passage of the arm 23, the edge portions 27 (Fig. 7) being slidable on said upper arm of said bracket, which is inwardly and upwardly inclined, as shown. Bolts 28 passed through apertures 29 in the ends of said bracket secure it to the post 7. 30, 30 are set screws for regulating the extent of movement of the rubbing plates and thereby the valve-stems, whereby a greater or lesser portion of the oil-holders or receivers therein are exposed to the oil supply in the tank.

31 indicates a double-end link secured by a pin 24' to the arm 23 of the plate 19 and by a pin 32 to the eye 33 of a bracket 34 secured to the post 7. Duplicates of these elements and also of the plate 19' and the valve elements carried thereby are preferably arranged on the distant side of the post. The distant valve-closure is shown in Fig. 1.

In Fig. 6 we have shown a bracket 25' having a slot 26' communicating with a channel 35 which is adapted to retain and permit sliding movements of trunnions 36 arranged on the sides of the arm 23' of a rubbing-plate 19''.

Considering now Figs. 2, 3 and 4, 19''' designates a rubbing-plate comprising a body portion having its upper end inturned to provide an oil-receiver in the center of which is a hemispherical projection or boss 37. 38 designates a bracket secured to the post 7, and 38' indicates a link pivoted at its ends to the web of the plate 19''' and bracket 38. 39 designates a bracket secured to said post and pivotally connected with the lower end portion of said web by means of a link 40. The bracket 39 has a shelf extension 41 on which the plate 19''' normally rests, to sustain the latter in operative position.

15' designates a valve-stem the lower end of which is provided with a head 42. In all other respects it is identical with the valve-stems 15. 43 designates an expansion spring embracing said valve-stem 15' and arranged intermediate the boss 14 and said head.

The exposed faces of the plates 19, 19', 19'' and 19''' are preferably identical. In devices of this character it is essential that there be an uneven surface by which the animal is attracted in order that he may scratch himself in the attempt to allay the irritation. One of the problems which has confronted inventors in this art has been to provide a plate having a suitable uneven surface which will not retain the oil in the depressions, where it will not come in contact with the animal's skin. To overcome this we provide a plurality of superposed semicircular or concave embossments the depending arcuate portion 46 of each of which communicates with the rising terminal or terminals 47 of one or two, as the case may be, in the next lower tier. As the oil 50 flows down, a portion of it will adhere lightly to the lower point of the embossed concave, and if there be a surplus it will flow therefrom onto the terminals of those below and thence onto the adjacent portion of the next lower ones, as shown clearly in Fig. 1.

The operation of the device shown in Fig. 1 is as follows: As the animal rubs in either an upward, forward, backward, or side movement against the plate 19 the plate will be moved laterally and upwardly on its hinge 31, and as it rises it will drive the valve-stem 15 upward and thus remove the closure from its seat, and open the valve. The oil 50 will then flow into the oil-retainer 16 in the side of the valve-stem and will be retained therein until said stem falls (by reason of another movement of the animal) when—simultaneously—the closure will shut off the oil-passage. It will be evident that either cylindrical end of the valve-stem, fitting snugly in the passage therefor, will practically but not fully shut off the oil supply; therefore it becomes necessary to provide the complete closure 18, which is operated by the weight of the rubbing-plate.

The operation of the plate 19′ is as follows:—As the animal bears against it its lower end will slide up the inclined runway afforded by the bracket 25 to actuate the valve-mechanism in the same manner as just described.

The pin 36 shown in Fig. 6 will travel in the channel 35 of the bracket 25′, the arm 23′ moving in the slot 26′ and the lower ends of the side portions of the plate sliding on the upper faces of the overhanging jaws 25″. Any suitable means is to be inserted through the registering openings 36′ to prevent escape of the member 19″.

In the operation of the arrangement shown in Figs. 2, 3 and 4 the plate 19‴ will move in an arc of a circle as it is borne against by the animal, and when the boss 37 strikes the head of the valve stem the spring 43 will be compressed thereby, the closure 18 simultaneously rising from its seat. The oil will drop onto said head and thence into the oil holder in the top of the rubbing-plate, and will flow thence downward in the same manner as hereinbefore described. Should one of the plates or the hinges on which it is hung become broken, the spring will expand and draw the closure 18 tightly down upon its seat to close the valve.

It requires but a very slight pressure to move either of the rubbing-plates sufficiently to open the valve communicating therewith; therefore it will be apparent that very small pigs will be as successfully treated as will larger and stronger animals.

It is to be observed that in each of the four illustrated forms of rubbing-plate-elevating means the movement of the plate is to all intents and purposes identical, that is to say, the plates each move in a diagonal direction. And while we have shown these modified forms, either of which may be adopted in the practice of the invention, we have by no means attempted to illustrate or specify all which might be employed, the object of this invention being to carry out the invention in either of the forms shown, and to fully comprehend its nature; and we desire it to be distinctly understood that specific mention and disclosure by us of some modifications is in no manner intended to exclude others not referred to but which are within the scope and spirit of the invention, viewed in its broadest aspect and as defined in these claims.

We therefore claim as our joint invention:

1. In a device of the nature described, a supporting element, a tank supported thereby, a valve communicating therewith, a rubbing-plate adapted to actuate said valve, and a pair of links whereby said plate is hinged to said supporting element at both its upper and lower portions.

2. In an oiler, a support, a tank thereon, a valve communicating with the tank, a rubbing-plate hinged to the support and adapted to actuate the valve, and a shelf-like bracket on which the plate normally rests.

3. In a device of the nature described, a tank, a support therefor, a rubbing-plate, an upper and a lower hinge-link interposed between said support and plate, and means whereby a movement of said plate will cause oil to be discharged from said tank.

4. In an oiler, a support, a tank, a valve communicating with the tank, a plate adapted to be actuated by an animal to actuate the valve, a pair of links whereby said plate is hinged to the support, said links normally inclined upward and outward, and means for so holding the plate that it will maintain the links in said positions.

5. In an oiler, a support, a bracket secured thereto near the upper end thereof, a second bracket, secured to the support in a lower horizontal plane than said bracket, a hinge-link pivoted at its outer end to the upper bracket, a hinge-link pivoted at its outer end to the lower bracket, a rubbing-plate to which the inner ends of the links are pivoted, a tank, and means intermediate said tank and plate whereby liquid may be released from the tank by reason of movement of the plate.

In testimony that we claim the foregoing as our joint invention we hereunto subscribe our names, this 18th day of August, 1914, at Galesburg, Illinois.

GUSTAVE WENZELMANN.
WILLIAM H. HARRISON.

In presence of—
L. F. WERTMAN,
F. L. CONGER.

Copies of this patent may be obtained for five cents each, by addressing the "Commissioner of Patents, Washington, D. C."